US007986486B2

(12) United States Patent
Abe et al.

(10) Patent No.: US 7,986,486 B2
(45) Date of Patent: Jul. 26, 2011

(54) HARD-DISK DRIVE, METHOD OF CONTROLLING THE HARD-DISK DRIVE, AND METHOD OF MANUFACTURING THE HARD-DISK DRIVE

(75) Inventors: Jiro Abe, Kanagawa (JP); Hiroshi Uchida, Kanagawa (JP); Tetsuo Ueda, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/470,460

(22) Filed: May 21, 2009

(65) Prior Publication Data

US 2009/0290251 A1    Nov. 26, 2009

(30) Foreign Application Priority Data

May 21, 2008   (JP) .................................. 2008-133561

(51) Int. Cl.
*G11B 21/02*   (2006.01)
(52) U.S. Cl. ........................................................ 360/75
(58) Field of Classification Search .................... None
See application file for complete search history.

(56) References Cited

U.S. PATENT DOCUMENTS

| | | | | |
|---|---|---|---|---|
| 6,724,562 | B1* | 4/2004 | Ang et al. | 360/78.04 |
| 7,133,237 | B2* | 11/2006 | Ikeda et al. | 360/75 |
| 7,242,551 | B2 | 7/2007 | Kurihara et al. | |
| 7,245,447 | B2 | 7/2007 | Zaitsu | |
| 7,417,821 | B2* | 8/2008 | Tsuchinaga | 360/78.04 |
| 7,529,058 | B2* | 5/2009 | Hara et al. | 360/77.06 |

* cited by examiner

*Primary Examiner* — K. Wong (57) ABSTRACT

A hard-disk drive. The hard-disk drive includes a magnetic-recording disk having a plurality of tracks formed thereon. The hard-disk drive also includes a magnetic-recording head configured to be positioned over a target track selected from the plurality of tracks and configured to write data to and to read data from the target track. Moreover, the hard-disk drive includes a range-definer configured to define an allowed range of a position error of the magnetic-recording head corresponding to the target track. In addition, the hard-disk drive includes a write-enabler configured to determine whether writing data by the magnetic-recording head is allowed based on the position error of the magnetic-recording head with respect to the target track and the allowed range that is calculated from data read out by the magnetic-recording head.

7 Claims, 7 Drawing Sheets

| Track Number (Radial Position) | Track Pitch |
|---|---|
| 1~2000 | 0.128 |
| 2001~4000 | 0.126 |
| ⋮ | ⋮ |
| N~N+2000 | 0.116 |

| Track Number (Radial Position) | Track Pitch |
|---|---|
| 1~2000 | 0.128 |
| 2001~4000 | 0.126 |
| ⋮ | ⋮ |
| N~N+2000 | 0.116 |
| | |

HARD-DISK DRIVE, METHOD OF CONTROLLING THE HARD-DISK DRIVE, AND METHOD OF MANUFACTURING THE HARD-DISK DRIVE

CROSS-REFERENCE TO RELATED APPLICATION

This application claims priority from the Japanese Patent Application No. 2008-133561, filed May 21, 2008, the disclosure of which is incorporated herein in its entirety by reference.

TECHNICAL FIELD

Embodiments of the present invention relate to a hard-disk drive (HDD), a method of controlling the HDD, and a method of manufacturing the HDD. In particular, embodiments of the present invention relate to technology for determining when writing data by a magnetic-recording head to a magnetic-recording disk is allowed.

BACKGROUND

In a HDD, there are formed a plurality of tracks on the magnetic-recording disk. A magnetic-recording head is positioned over a target track selected from a plurality of tracks so that the track may be written with data. At this time, whether or not a track may be written with data is determined according to whether or not the position error of the magnetic-recording head is within a predetermined allowed range. However, the position error of the magnetic-recording head when writing data may fall outside of this predetermined allowed range, which can lead to degradation in write performance of the magnetic-recording head.

SUMMARY

Embodiments of the present invention include a hard-disk drive. The hard-disk drive includes a magnetic-recording disk having a plurality of tracks formed thereon. The hard-disk drive also includes a magnetic-recording head configured to be positioned over a target track selected from the plurality of tracks and configured to write data to and to read data from the target track. Moreover, the hard-disk drive includes a range-definer configured to define an allowed range of a position error of the magnetic-recording head corresponding to the target track. In addition, the hard-disk drive includes a write-enabler configured to determine whether writing data by the magnetic-recording head is allowed based on the position error of the magnetic-recording head with respect to the target track and the allowed range that is calculated from data read out by the magnetic-recording head.

DESCRIPTION OF THE DRAWINGS

The accompanying drawings, which are incorporated in and form a part of this specification, illustrate embodiments of the invention and, together with the description, serve to explain the embodiments of the invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention.

DESCRIPTION OF EMBODIMENTS OF THE PRESENT INVENTION FOR A HARD-DISK DRIVE, A METHOD FOR CONTROLLING THE HARD-DISK DRIVE AND A METHOD FOR MANUFACTURING THE HARD-DISK DRIVE

As is well known in the art, self-servo writing is commonly used to form tracks on a magnetic-recording disk. In self-servo writing, servo data is written by a magnetic-recording head using a positioning mechanism included in the hard-disk drive (HDD). Of the plurality of tracks thus formed, the track pitches of some tracks may differ according to the radial position of these tracks on the magnetic-recording disk because of, for example, such factors as the flying characteristic of the magnetic-recording head. In this situation where the track pitches differ as described above, the actually allowed position error of the magnetic-recording head when writing data correspondingly varies. Nevertheless, for a conventional HDD, there is an allowed range that is used to determine whether or not a write operation is allowed. Consequently, it is possible for the allowed range, which is utilized, to deviate from the actual allowed range thereby deteriorating the write performance. Embodiments of the present invention address this issue and provide a HDD, a method for controlling the HDD and a method for manufacturing the HDD, whereby an allowed range of the position error of the magnetic-recording head can be appropriately defined, as are subsequently described in greater detail.

Figure 1:
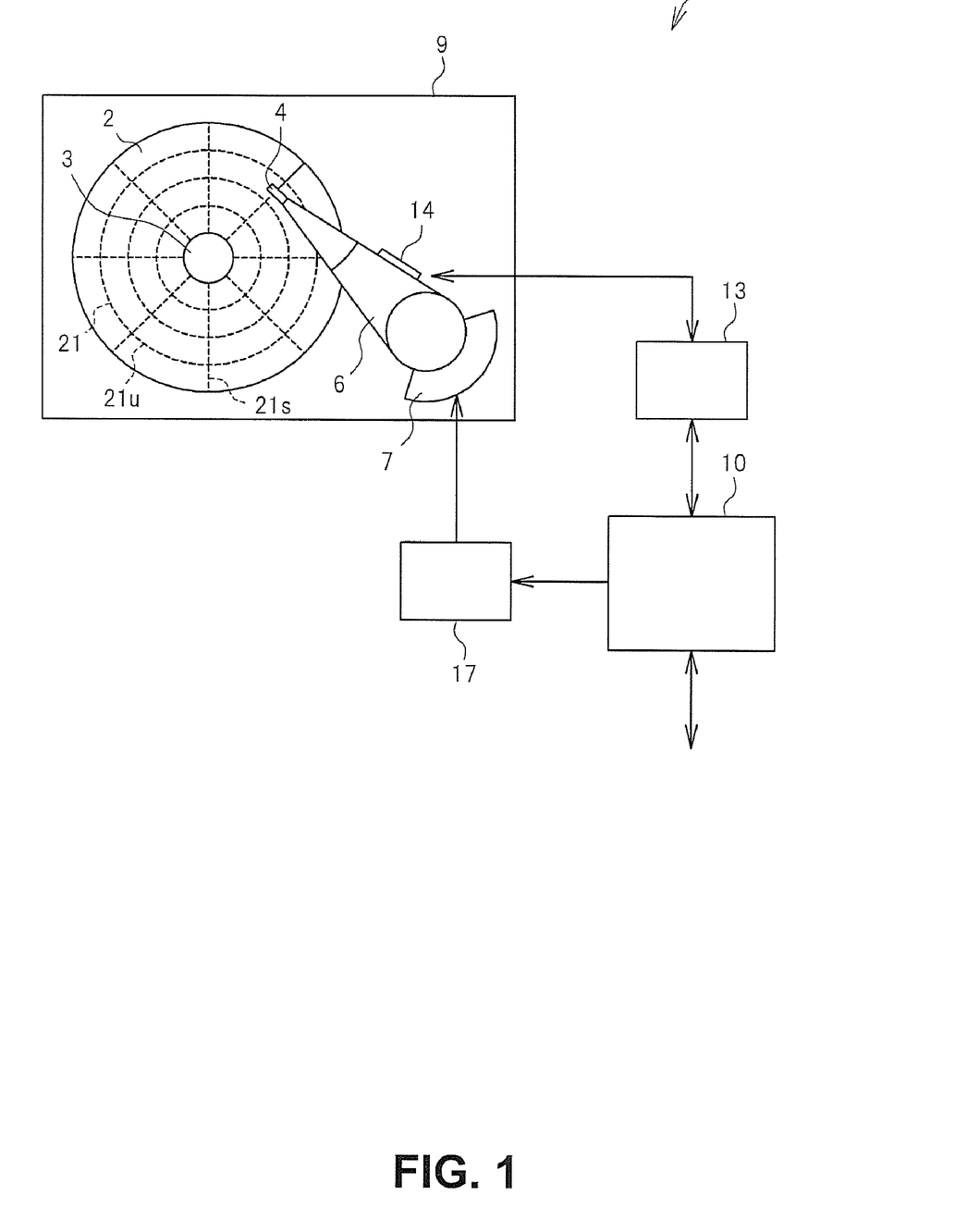
FIG. 1 is an illustration showing an example configuration of a hard-disk drive (HDD), in accordance with an embodiment of the present invention.

With reference now to FIG. 1, in accordance with an embodiment of the present invention, an example configuration of a HDD 1 is shown. A housing 9 of the HDD 1 accommodates a magnetic-recording disk 2 and a head-gimbal assembly (HGA) 6. The magnetic-recording disk 2 is attached to a spindle motor 3 provided at the bottom portion of the housing 9. The magnetic-recording disk 2 has a plurality of tracks 21 formed thereon in a concentric manner. Each track 21 has servo data regions 21s disposed at predetermined intervals along the circumferential direction and user-data regions 21u located in between. The servo data region 21s has servo data including address data and a burst signal recorded therein. The user-data region 21u has user-data recorded therein. The HGA 6 is pivotably disposed adjacent to the magnetic-recording disk 2. On the distal end of the HGA 6, there is supported a magnetic-recording head 4. Opposite the distal end of HGA 6, at the proximal end of the HGA 6, there is provided a voice-coil motor (VCM) 7. The VCM 7 rotatably drives the HGA 6, thereby allowing the magnetic-recording head 4 to move over the magnetic-recording disk 2 substantially in the radial direction.

With further reference to FIG. 1, in accordance with an embodiment of the present invention, the HDD 1 has a main control circuit 10, a read-write channel (R/W channel) 13, and a motor driver 17 disposed on a substrate external to the housing 9. The main control circuit 10 includes a micro processing unit (MPU), a hard disk controller (HDC), and a memory device. The main control circuit 10, upon receipt of user-data to be recorded on the magnetic-recording disk 2 from an external host, outputs the user-data to the R/W channel 13. The R/W channel 13 modulates the user-data and outputs the modulated data to a head amplifier 14. The head amplifier 14 converts the modulated user-data into a recording signal and outputs the signal to the magnetic-recording head 4. The magnetic-recording head 4 applies a magnetic field corresponding to the recording signal to the magnetic-recording disk 2 thereby writing the user-data thereto.

With further reference to FIG. 1, in accordance with an embodiment of the present invention, magnetic-recording head 4 reads out a signal from a fringing magnetic field from the magnetic-recording disk 2 and outputs this read-back signal to the head amplifier 14. The head amplifier 14 amplifies this read-back signal and outputs the amplified signal to the R/W channel 13. The R/W channel 13 converts the amplified signal into digital data, demodulates the data, and outputs the resultant data to the main control circuit 10. The main control circuit 10 transmits the demodulated user-data to the external host. Further, the R/W channel 13 extracts servo data from the read-back signal at a predetermined sampling period and outputs the servo data to the main control circuit 10. Further, the main control circuit 10 reads out and executes a program stored in the memory device to thereby carry out various controls such as position control of the magnetic-recording head 4.

With further reference to FIG. 1, in accordance with an embodiment of the present invention, in the position control of the magnetic-recording head 4, the main control circuit 10 identifies the present position of the magnetic-recording head 4 based on the servo data read out by the magnetic-recording head 4, generates a control signal for positioning the magnetic-recording head 4 over a target track, and outputs the control signal to the VCM 7 through the motor driver 17. More specifically, the main control circuit 10 performs a seek control and a servo control as the position control of the magnetic-recording head 4. In the seek control, the main control circuit 10 extracts the target track from the plurality of tracks 21 based on a recording command or a read-back command from the external host and also identifies the present position of the magnetic-recording head 4 from servo data read out by the magnetic-recording head 4, thereby moving the magnetic-recording head 4 toward the target track. Then, the main control circuit 10 proceeds to the servo control. In this servo control, the main control circuit 10 calculates an position-error signal (PES), representing the position error of the magnetic-recording head 4 with respect to the target track, from the burst signal included in the servo data read out by the magnetic-recording head 4, and thereby positions the magnetic-recording head 4 at the target track. Writing and reading data by the magnetic-recording head 4 are performed during the course of this servo control.

With further reference to FIG. 1, in accordance with an embodiment of the present invention, the HDD 1 includes a magnetic-recording disk having a plurality of tracks formed thereon and a magnetic-recording head 4 configured to be positioned over a target track selected from the plurality of tracks and configured to write data to and to read data from the target track. The HDD 1 further includes a range-definer, for example, which may include a defining means, configured to define an allowed range of a position error of the magnetic-recording head 4 corresponding to the target track. Moreover, the HDD 1 includes a write-enabler, for example, which may include a determining means, configured to determine whether or not writing data by the magnetic-recording head 4 is allowed based on the position error of the magnetic-recording head 4 with respect to the target track and the allowed range, which is calculated from data read out by the magnetic-recording head 4. In one embodiment of the present invention, the range-definer obtains the track pitch at the target track based on each of the track pitches of the plurality of tracks evaluated in advance and defines the in accordance with the track pitch. In another embodiment of the present invention, the HDD 1 may also include a memory, for example, which may include a storage means, configured to store a table representing a relationship between the each of the tracks and the track pitch prepared by evaluating the track pitch of each of the plurality of tracks in advance, wherein the range-definer reads out from the table the track pitch at the target track. In one embodiment of the present invention, the range-definer is adapted to obtain the track pitch at the target track from an equation representing a relationship between the each track and the track pitch prepared by evaluating each of the track pitches of the plurality of tracks in advance. In another embodiment of the present invention, the range-definer obtains the track pitch at the target track based on the track pitches of the plurality of tracks corresponding to the radial positions of the magnetic-recording disk evaluated in advance and defines the allowed range in accordance with the track pitch. In an embodiment of the present invention, the allowed range of the position error of the magnetic-recording head 4 is defined with respect to the target track. Consequently, the allowed range may be appropriately defined, as is next described.

Figure 2:
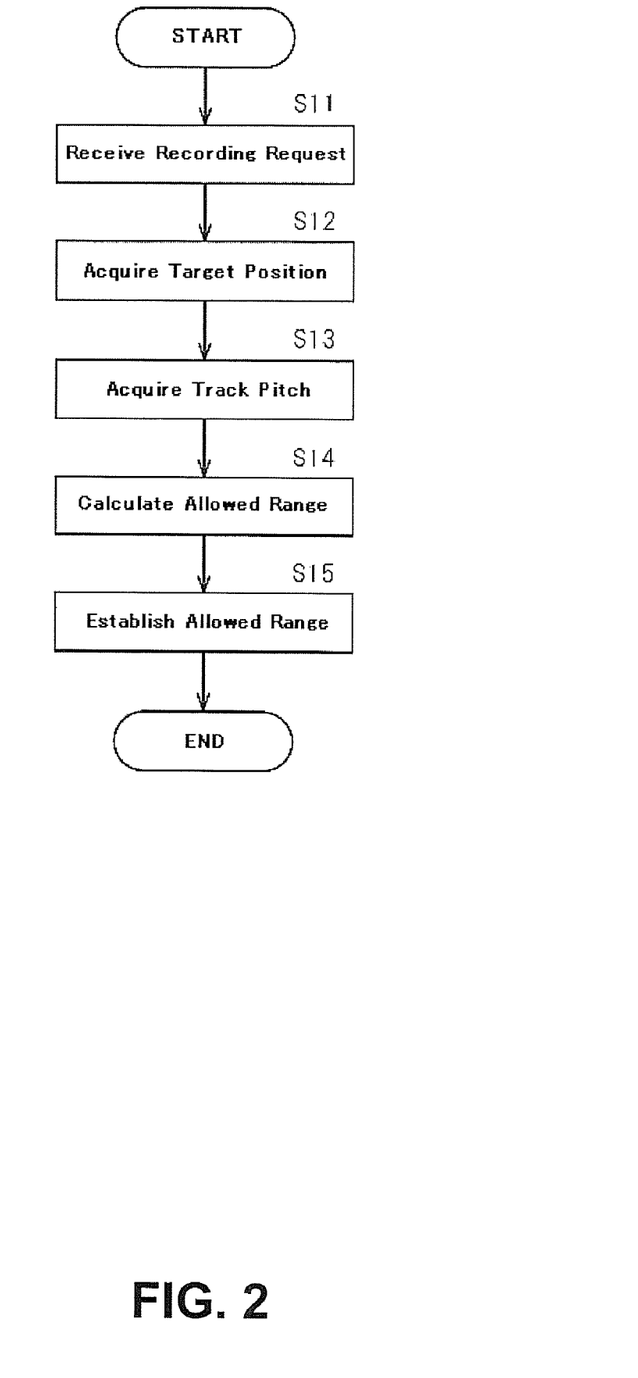
FIG. 2 is a flowchart showing a method of controlling a HDD, in accordance with an embodiment of the present invention.

With reference now to FIG. 2, in accordance with an embodiment of the present invention, a flowchart that illustrates the method of controlling the HDD 1 is shown. At S11, the main control circuit 10 receives a recording request from the external host. At S12, the main control circuit 10 acquires the target position of the magnetic-recording head 4. More specifically, the recording request from the external host includes a logical block address (LBA), which is a parameter specifying the recording position of the data in serial number. The main control circuit 10 acquires the target position of the magnetic-recording head 4 by converting the LBA into a CHS, which is a parameter specifying the recording position of the data with use of the track number, the sector number, and the like. Accordingly, the track number included in this target position represents the target track. Also, the main control circuit 10 performs the seek control through the described operation. At S13, the main control circuit 10, a portion of which functioning as the range-definer, acquires the track pitch at the target track. More specifically, the main control circuit 10 refers to a table representing a relationship between each track and the track pitch held in the memory, for example, such as a memory device, and reads out the track pitch corresponding to the target track.

With further reference to FIG. 2, in accordance with an embodiment of the present invention, the method of controlling a HDD 1, including a magnetic-recording disk having a plurality of tracks formed thereon and a magnetic-recording head 4 configured to be positioned over a target track selected from the plurality of tracks and configured to write data to and to read data from the target track, includes defining an allowed range of a position error of the magnetic-recording head 4 in accordance with the target track. The method of controlling the HDD 1 also includes determining whether or not writing data by the magnetic-recording head 4 is allowed based on the position error of the magnetic-recording head 4 with respect to the target track and the allowed range that is calculated from data read out by the magnetic-recording head 4.

Figure 3A:
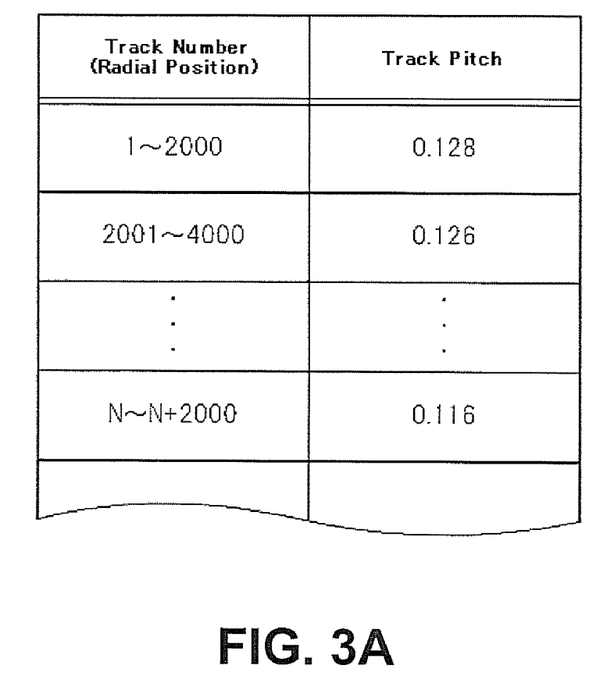
FIG. 3A is an illustration showing an example of the content of a table, in accordance with an embodiment of the present invention.

With reference now to FIG. 3A, in accordance with an embodiment of the present invention, an example of the content of the table is shown. This table is prepared by evaluating in advance each track pitch of a plurality of tracks 21 formed on the magnetic-recording disk 2 as described later. In this table, each group including a predetermined number of tracks is associated with its track pitch. These groups are divided such that each group is made up of a predetermined number of tracks with continuous track numbers. Since, here, the track numbers are corresponding to the radial positions of the magnetic-recording disk 2, the table can be said to represent track pitches corresponding to radial positions of the magnetic-recording disk 2. One track pitch may be associated with each track, which is by way of example and not limitation. Otherwise, the main control circuit 10 may obtain the track pitch at a target track based on an equation representing a relationship between each track and the track pitch, as is next described.

Figure 3B:
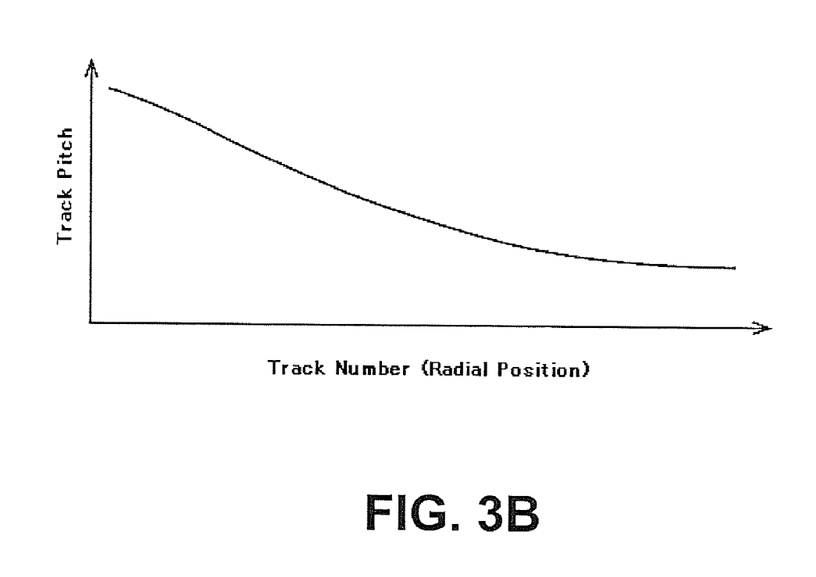
FIG. 3B is an illustration showing an example of the content of an equation, in accordance with an embodiment of the present invention.

With reference now to FIG. 3B, in accordance with an embodiment of the present invention, an example of the content of such an equation is shown. As described later, this equation can also be prepared by evaluating in advance each of the track pitches of the plurality of tracks 21 formed on the magnetic-recording disk 2. In the equation, track pitches corresponding to track numbers are expressed by a function. The equation may also be said to represent track pitches corresponding to the radial positions of the magnetic-recording disk 2.

With reference once again to FIG. 2, in accordance with an embodiment of the present invention, at S14, the main control circuit 10, a portion of which functioning as a range-definer, defines the allowed range of the PES representing the position error of the magnetic-recording head 4 corresponding to the track pitch at the target track. The allowed range represents, as described later, the permitted amount of position error of the magnetic-recording head 4, when the magnetic-recording head 4 writes data. More specifically, the main control circuit 10 obtains the threshold value of the allowed range by calculation. The threshold value of the allowed ranged is known as the "writer inhibit criteria (WIC)," a term of art. The threshold value of the allowed range can for example be obtained as shown in equation 1:

$$WIC = \frac{TP_A}{TP_R} \times WIC_R \qquad \text{(Eq. 1)}$$

In this equation 1, WIC represents the threshold value of the allowed range that is sought and $TP_A$ represents the track pitch at the target track. $TP_R$ represents the track pitch as a criterion and $WIC_R$ represents the threshold value of the allowed range of the track pitch as a criterion.

With further reference to FIG. 2, in accordance with an embodiment of the present invention, at S15, the main control circuit 10 establishes the calculated allowed range as an allowed range of the PES applicable when data is written. Thereupon, the main control circuit 10 shifts from the seek control to the servo control, in which it, when data is written by the magnetic-recording head 4, determines whether or not the write is allowed according to whether or not the PES is above the threshold value of the allowed range, given by the WIC. The above described embodiment of the present invention is by way of example and not limitation. For example, it may also be arranged such that the allowed range corresponding to the target track is defined based on an allowed range of each track defined in advance from each of the track pitches of a plurality of tracks 21 evaluated in advance. In other words, by having a table or the like representing the relationship between each track and its allowed range prepared in advance, the allowed range corresponding to the target track may be defined based on such table or the like.

Figure 4:
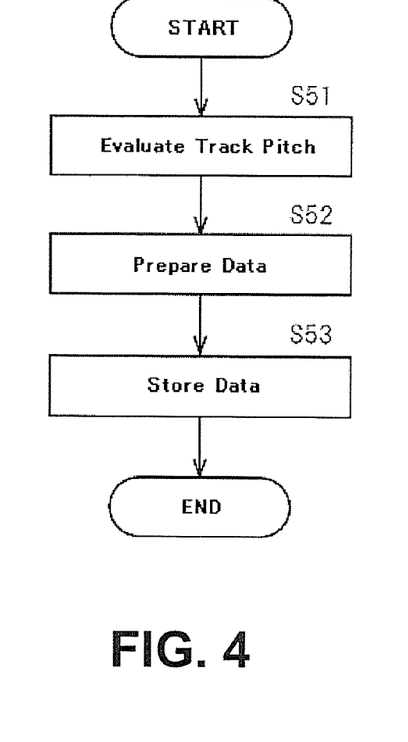
FIG. 4 is a flowchart showing a method of manufacturing a HDD, in accordance with an embodiment of the present invention.

With reference now to FIG. 4, in accordance with an embodiment of the present invention, a flowchart that illustrates a method of manufacturing a HDD 1 is shown. This flowchart represents a portion of the manufacturing process performed after a plurality of tracks 21 have been formed on a magnetic-recording disk 2. At S51, each of the track pitches of the plurality of tracks 21 formed on the magnetic-recording disk 2 is evaluated. The evaluation of the track pitch is performed using a positioning mechanism included in the HDD 1. More specifically, while the VCM 7 is controlled by an external device, servo data read out by the magnetic-recording head 4 is acquired. This operation may also be performed by the main control circuit 10. Then, the track pitch is evaluated based on the thus acquired servo data. More specifically, the track pitch can be evaluated, for example, as next described.

Figure 5A:
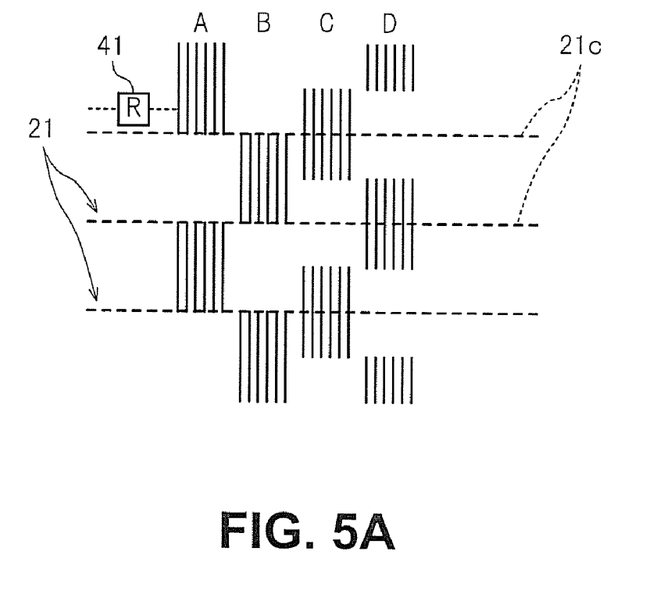
FIG. 5A is an illustration showing an example of tracks formed on a magnetic-recording disk, in accordance with an embodiment of the present invention.
Figure 5B:
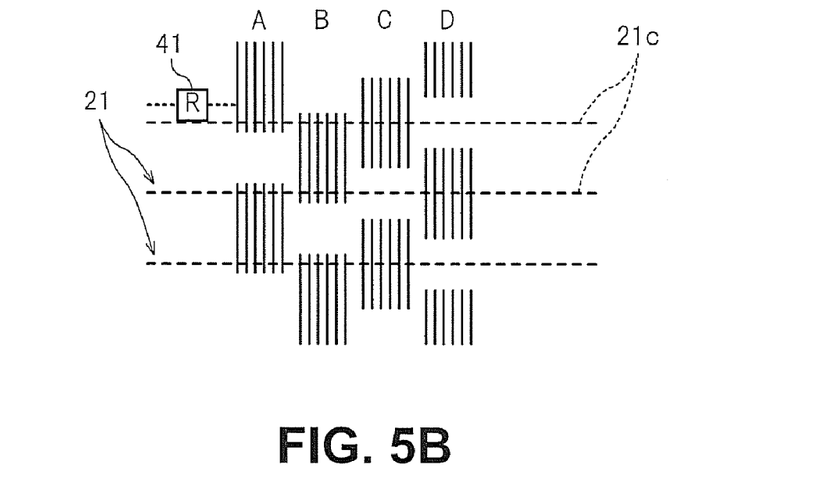
FIG. 5B is an illustration showing an alternative example of tracks formed on a magnetic-recording disk, in accordance with an embodiment of the present invention.
Figure 5C:
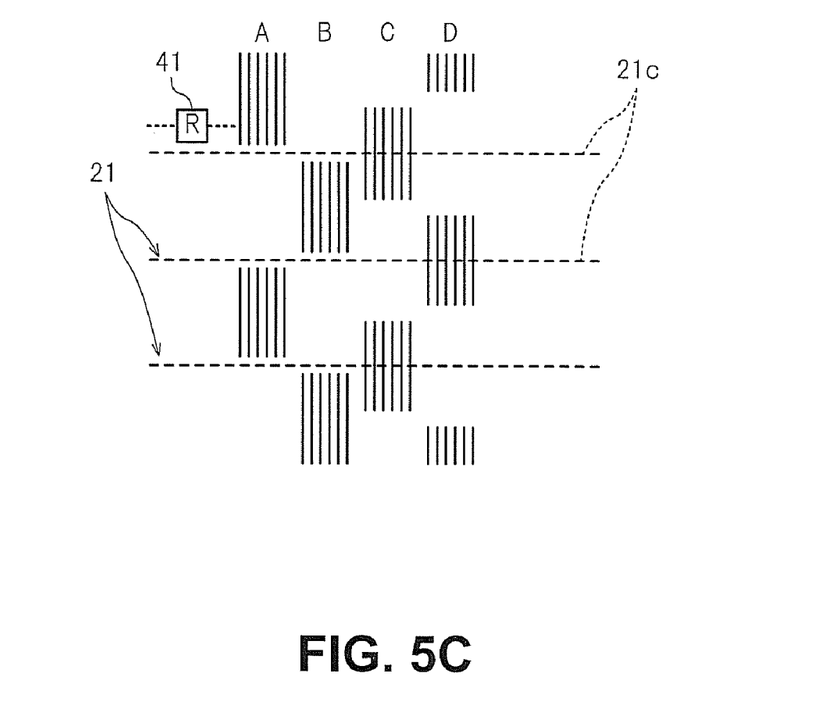
FIG. 5C is an illustration showing a further example of tracks formed on a magnetic-recording disk, in accordance with an embodiment of the present invention.

With reference now to FIGS. 5A, 5B and 5C, in accordance with an embodiment of the present invention, examples of tracks 21 formed on the magnetic-recording disk 2 are shown in FIG. 5A and FIG. 5C. In these drawings, portions of burst signals A-D included in servo data are shown enlarged. Each track 21 is determined by the burst signals A-D. More specifically, the middle portion between the burst signal A and the burst signal B in the direction of their recorded widths is set to be the center 21$c$ of the track 21. Here, it sometimes occurs that the burst signal A and the burst signal B, or the burst signal C and the burst signal D, are recorded in a partly overlapping manner in the recorded direction as shown in FIG. 5B, or recorded in a separated manner in the recorded direction as shown in FIG. 5C. Therefore, in the cases of FIG. 5A-FIG. 5C, the pitches between the centers 21$c$ (track pitches) of the tracks 21 may become different.

With further reference to FIG. 4, in accordance with an embodiment of the present invention, the method of manufacturing a HDD 1, including a magnetic-recording disk having a plurality of tracks formed thereon and a magnetic-recording head 4 configured to be positioned over a target track selected from the plurality of tracks and configured to write data to and to read data from the target track, includes evaluating each of the track pitches of the plurality of tracks. The method of manufacturing the HDD 1 also includes storing data representing a relationship between the each track and the track pitch in a storage unit of the HDD 1.

Figure 6A:
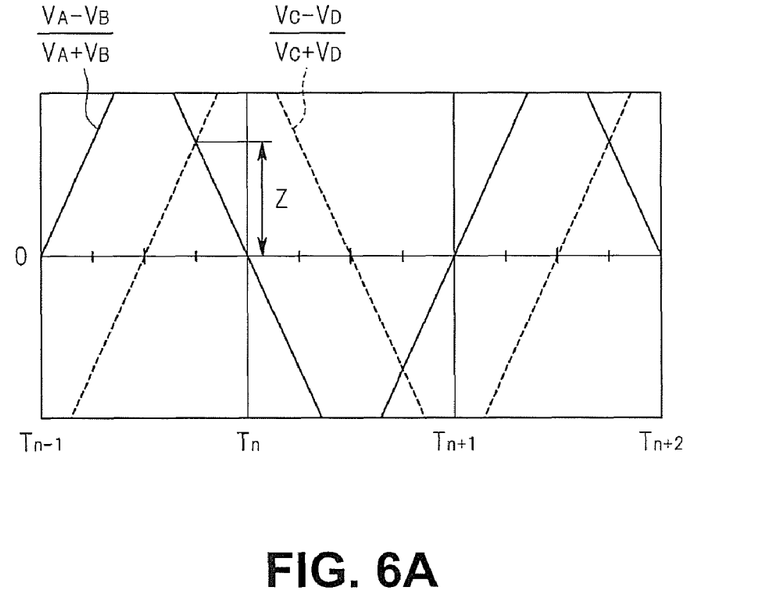
FIG. 6A is an illustration showing an example of burst signals read out from a track, in accordance with an embodiment of the present invention.
Figure 6B:
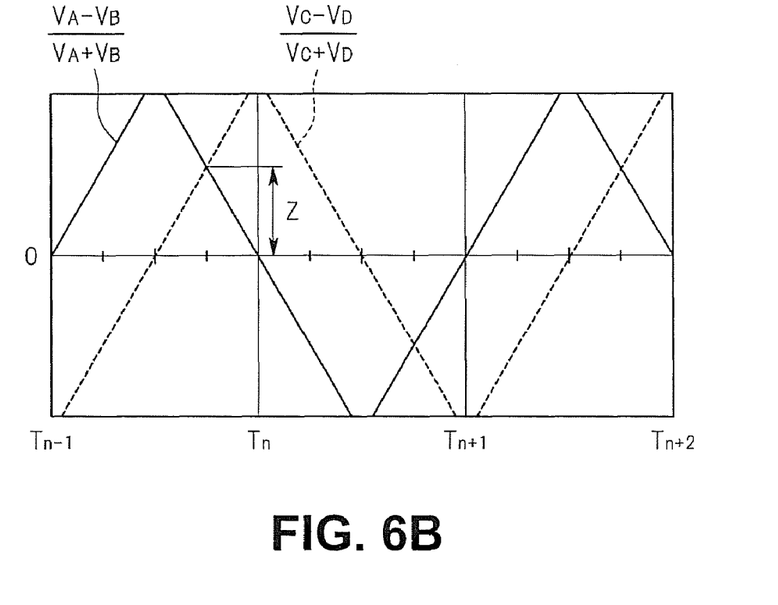
FIG. 6B is an illustration showing an alternative example of burst signals read out from a track, in accordance with an embodiment of the present invention.
Figure 6C:
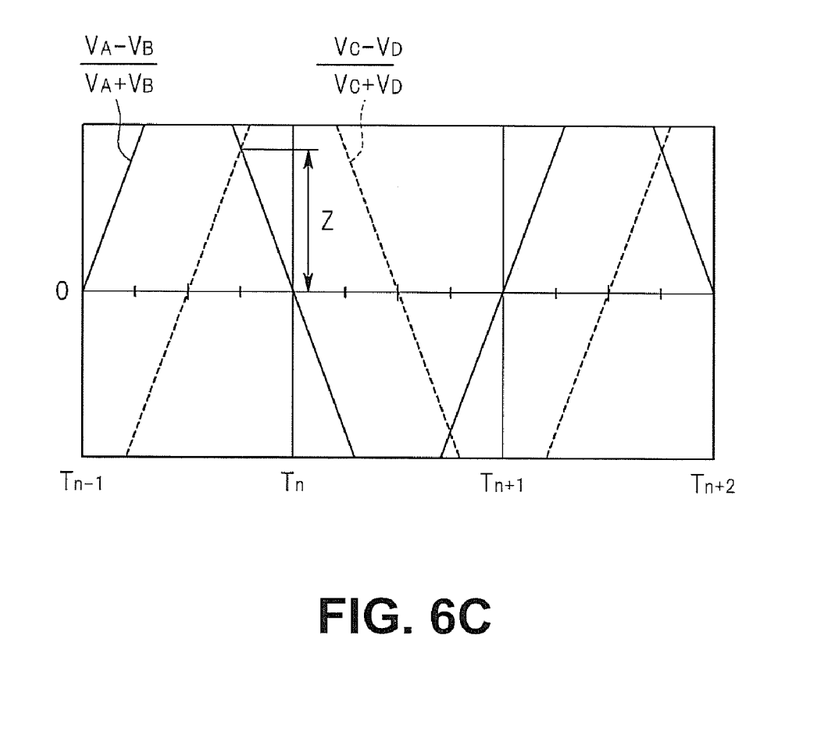
FIG. 6C is an illustration showing a further example of burst signals read out from a track, in accordance with an embodiment of the present invention.
Figure 7:
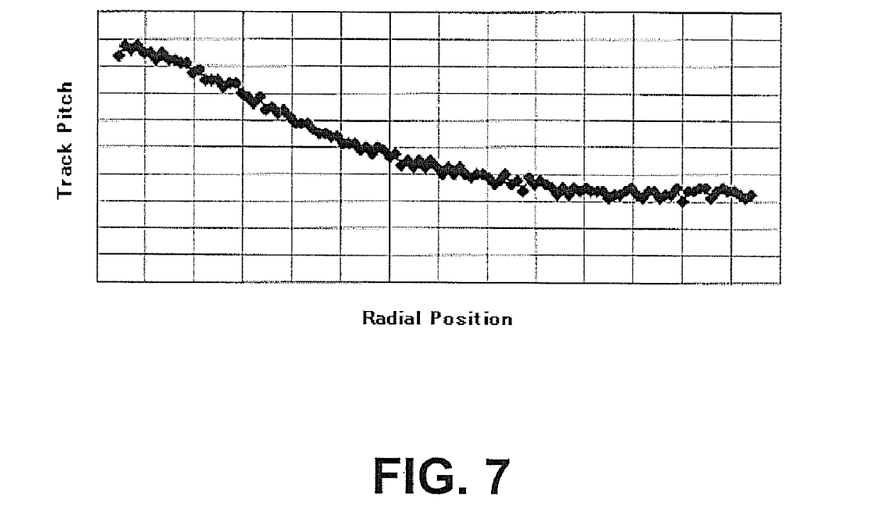
FIG. 7 is an illustration showing an example of results of evaluation of track pitches, in accordance with an embodiment of the present invention.

With reference now to FIGS. 6A, 6B and 6C, in accordance with an embodiment of the present invention, examples of burst signals read out from a track 21 are shown. These drawings correspond to the above mentioned FIG. 5A to FIG. 5C, respectively. In these drawings, the horizontal axis represents positions in the direction of the width of the track 21 and T represents the center 21$c$ of each track 21; the vertical axis represents an amplitude ratio $(V_A-V_B)/(V_A+V_B)$ and an amplitude ratio $(V_C-V_D)/(V_C+V_D)$ calculated from amplitudes $V_A$ to $V_D$ of the burst signals A to D read out at each position. Here, the amplitude ratio $(V_A-V_B)/(V_A+V_B)$ and the amplitude ratio $(V_C-V_D)/(V_C+V_D)$ become equal at the position separated from the center 21$c$ of the track 21 by ¼ the track pitch (hereinafter, the amplitude ratio at this point will be called "amplitude ratio Z."). This amplitude ratio Z varies in accordance with the track pitch. Namely, the smaller the track pitch is, the smaller the amplitude ratio Z becomes; on the other hand, the larger the track pitch is, the larger the amplitude ratio Z becomes. Therefore, by utilizing this, the track pitch can be obtained from the amplitude ratio Z. Then, the external apparatus locates a read element 41 of the magnetic-recording head 4 at the position separated from the center 21$c$ of the track 21 by ¼ the track pitch by controlling the VCM 7 such that the amplitude ratio $(V_A-V_B)/(V_A+V_B)$ and the amplitude ratio $(V_C-V_D)/(V_C+V_D)$ of the burst signals A-D read out by the read element 41 become equal (refer to FIG. 5) and obtains the amplitude ratio Z at this point. The track pitch can be obtained from the thus obtained amplitude ratio Z. Such operations to obtain the track pitch may be performed, for example, at intervals of a predetermined number of tracks of a plurality of tracks 21 formed on the magnetic-recording disk 2. That is, by having the plurality of tracks 21 divided into a plurality of groups each thereof having a predetermined number of tracks with continuous track numbers, the described operations may be performed on the track representing each group. An example of results of evaluation obtained in the described manner is shown in FIG. 7. The above described embodiment of the present invention is by way of example and not limitation, as the track pitch may be obtained for all of the tracks 21 formed on a magnetic-recording disk 2.

With reference now to FIG. 7 and once again to FIG. 4, in accordance with an embodiment of the present invention, at S52, data representing the relationship between each track 21 and the track pitch is prepared based on the results of the described evaluation. More particularly, a table as shown in FIG. 3A is prepared as the data representing the relationship between each track 21 and the track pitch. Here, the table is prepared by having the track pitch obtained from the track representing each group taken as the track pitch to be associated with the track pitches of the tracks 21 belonging to each group. Otherwise, as the data representing the relationship between each track 21 and the track pitch, data involving the above referred equation shown in FIG. 3B may be prepared, for example, by a computer program. The equation may be obtained for example by approximating the results of evaluation shown in FIG. 7 with a function.

With further reference to FIG. 4, in accordance with an embodiment of the present invention, although data such as the table is prepared in these examples by using the results of evaluation as they are or by modifying the same, the method of preparing such data is not limited to embodiments of the present invention described above. For example, by having a plurality of sets of data representing typical characteristics of a track pitch corresponding to a radial position of the magnetic-recording disk prepared in advance, the closest one to the results of evaluation from the plurality of sets of data may be selectively used. At S53, the data prepared as above is stored in the memory device of the main control circuit 10 of the HDD 1. In addition, the data may be recorded on the magnetic-recording disk 2. The thus stored data is used in the HDD 1 as described above for defining the allowed range of a PES correspondingly with the target track.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A hard-disk drive comprising:

a magnetic-recording disk having a plurality of tracks formed on at least one side thereof;

a magnetic-recording head configured to be positioned over a target track selected from said plurality of tracks formed on a same side of said magnetic-recording disk and configured to write data to and to read data from said target track;

a range-definer configured to define an allowed range of a position error of said magnetic-recording head corresponding to a track pitch of said target track; and a write-enabler configured to determine whether writing data by said magnetic-recording head is allowed based on said position error of said magnetic-recording head with respect to said target track and said allowed range corresponding to said track pitch that is calculated from data read out by said magnetic-recording head.

2. The hard-disk drive according to claim 1, wherein said range-definer obtains said track pitch at said target track based on each of said track pitches of said plurality of tracks evaluated in advance and defines said allowed range in accordance with said track pitch.

3. The hard-disk drive according to claim 2, further comprising a memory configured to store a table representing a relationship between said each track and said track pitch prepared by evaluating each of said track pitches of said plurality of tracks in advance, wherein said range-definer reads out from said table said track pitch at said target track.

4. The hard-disk drive according to claim 2, wherein said range-definer obtains said track pitch at said target track from an equation representing a relationship between said each track and said track pitch prepared by evaluating each of said track pitches of said plurality of tracks in advance.

5. The hard-disk drive according to claim 1, wherein said range-definer obtains said track pitch at said target track based on said track pitches of said plurality of tracks corresponding to said radial positions of said magnetic-recording disk evaluated in advance and defines said allowed range in accordance with said track pitch.

6. A method of controlling a hard-disk drive, including a magnetic-recording disk having a plurality of tracks formed on at least one side thereof and a magnetic-recording head configured to be positioned over a target track selected from said plurality of tracks and configured to write data to and to read data from said target track, said method comprising:

defining an allowed range of a position error of said magnetic-recording head corresponding to a track pitch of said target track selected from said plurality of tracks formed on a same surface of said magnetic-recording disk; and determining whether or not writing data by said magnetic-recording head is allowed based on said position error of said magnetic-recording head with respect to said target track and said allowed range that is calculated from data read out by said magnetic-recording head.

7. A method of manufacturing a hard-disk drive, including a magnetic-recording disk having a plurality of tracks formed on at least one side thereof and a magnetic-recording head configured to be positioned over a target track selected from said plurality of tracks and configured to write data to and to read data from said target track, said method comprising:

evaluating each of said track pitches of said plurality of tracks formed on at least one side of said magnetic-recording disk; and storing data representing a relationship between said each track and said track pitch occurring on a same surface of said magnetic recording disk in a storage unit of said hard-disk drive.

* * * * *